United States Patent [19]

Klingel, Hans et al.

[11] Patent Number: 4,757,511
[45] Date of Patent: Jul. 12, 1988

[54] HIGH FREQUENCY FOLDED CROSS-FLOW GAS LASER WITH APPROVED GAS FLOW CHARACTERISTICS AND METHOD FOR PRODUCING LASER BEAM USING SAME

[75] Inventors: Klingel, Hans, Moeglingen; Juergen Weick, Asperg; Frank Ackermann, Stuttgart, all of Fed. Rep. of Germany

[73] Assignee: Trumpf GmbH & Company, Fed. Rep. of Germany

[21] Appl. No.: 800,975

[22] Filed: Nov. 22, 1985

[30] Foreign Application Priority Data

Nov. 24, 1984 [DE] Fed. Rep. of Germany ....... 3442898
Sep. 14, 1985 [DE] Fed. Rep. of Germany ... 8526361[U]

[51] Int. Cl.$^4$ ............................................. H01S 3/22
[52] U.S. Cl. ...................................... 372/58; 372/61; 372/83; 372/93
[58] Field of Search ................... 372/34, 58, 61, 62, 372/83, 87, 93, 92, 59, 55

[56] References Cited

U.S. PATENT DOCUMENTS

| | | | |
|---|---|---|---|
| Re. 31,279 | 6/1983 | Mefferd et al. | 372/107 |
| 3,477,036 | 11/1969 | Haisma | 372/107 |
| 3,524,144 | 8/1970 | Buser et al. | 372/70 |
| 3,577,096 | 5/1971 | Bridges et al. | 372/83 |
| 3,660,778 | 5/1972 | Le Blanc, Sr. | 372/93 |
| 3,683,297 | 8/1972 | Hobart et al. | 372/93 |
| 3,725,735 | 4/1973 | Beaulieu et al. | 372/83 |
| 3,743,963 | 7/1973 | Bullis et al. | 372/83 |
| 3,748,594 | 7/1973 | Pugh | 372/58 |
| 3,783,407 | 1/1974 | Mefferd et al. | 372/29 |
| 3,787,781 | 1/1974 | Medicus et al. | 372/87 |
| 3,855,547 | 12/1974 | Kirk | 372/100 |
| 3,900,804 | 8/1975 | Davis et al. | 372/100 |
| 3,919,663 | 11/1975 | Caruolo et al. | 372/107 |
| 3,921,097 | 11/1975 | Caristi et al. | 372/83 |
| 3,935,547 | 1/1976 | Riemersma et al. | 372/83 |
| 3,936,767 | 2/1976 | Besson et al. | 372/65 |
| 4,009,143 | 2/1977 | Luhleich et al. | 427/221 |
| 4,064,465 | 12/1977 | Hundstad et al. | 372/58 |
| 4,099,141 | 7/1978 | Leblanc et al. | 372/93 |
| 4,180,784 | 12/1979 | Nelson et al. | 372/26 |
| 4,237,430 | 12/1980 | Liu et al. | 372/61 |
| 4,242,647 | 12/1980 | Macken | 372/58 |
| 4,287,483 | 9/1981 | Rudko et al. | 372/83 |
| 4,287,487 | 9/1981 | Kuwabara et al. | 372/85 |
| 4,359,777 | 11/1982 | Fox et al. | 372/61 |
| 4,365,335 | 12/1982 | Lamboo | 372/34 |
| 4,375,690 | 3/1983 | Tabata et al. | 372/82 |
| 4,423,510 | 12/1983 | Pack et al. | 372/82 |
| 4,426,705 | 1/1984 | Stevison et al. | 372/58 |
| 4,455,658 | 6/1984 | Sutter, Jr. | 372/38 |
| 4,464,760 | 8/1974 | Sutter, Jr. | 372/38 |
| 4,499,582 | 2/1985 | Karning et al. | 372/93 |
| 4,500,998 | 2/1985 | Kuwabara et al. | 372/61 |
| 4,602,372 | 7/1986 | Sasaki et al. | 372/58 |

FOREIGN PATENT DOCUMENTS

| | | | |
|---|---|---|---|
| 0019691 | 2/1981 | Japan | 372/59 |
| 0136983 | 8/1984 | Japan | 372/58 |
| 0054488 | 3/1985 | Japan | 372/61 |
| 0057986 | 4/1985 | Japan | 372/58 |

*Primary Examiner*—James W. Davie
*Assistant Examiner*—B. Randolph

[57] ABSTRACT

A high frequency cross-flow gas laser has a tubular conduit divided into a multiplicity of gas flow sections with gas inlets adjacent each of the mirrors therein and outlets therebetween. A pair of electrodes is provided along each flow section to produce a high frequency electrical discharge in the lasing gas mixture, and a cooler is used to chill the gas withdrawn from the conduit for recycling thereto. The electrode pairs are desirably radially rotated relative to one another to produce uniformity of the energy discharge across the cross-section of the lasing gas mixture.

19 Claims, 4 Drawing Sheets

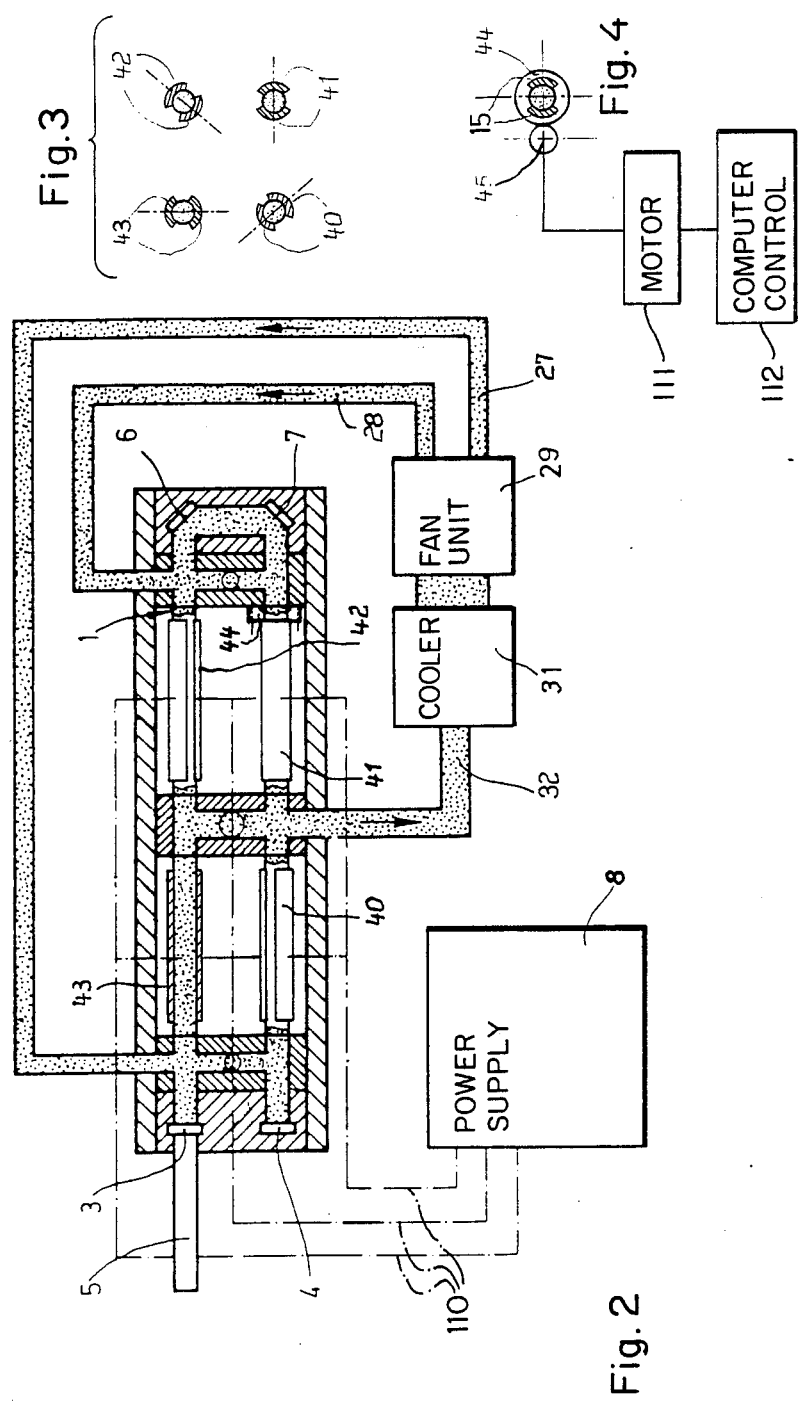

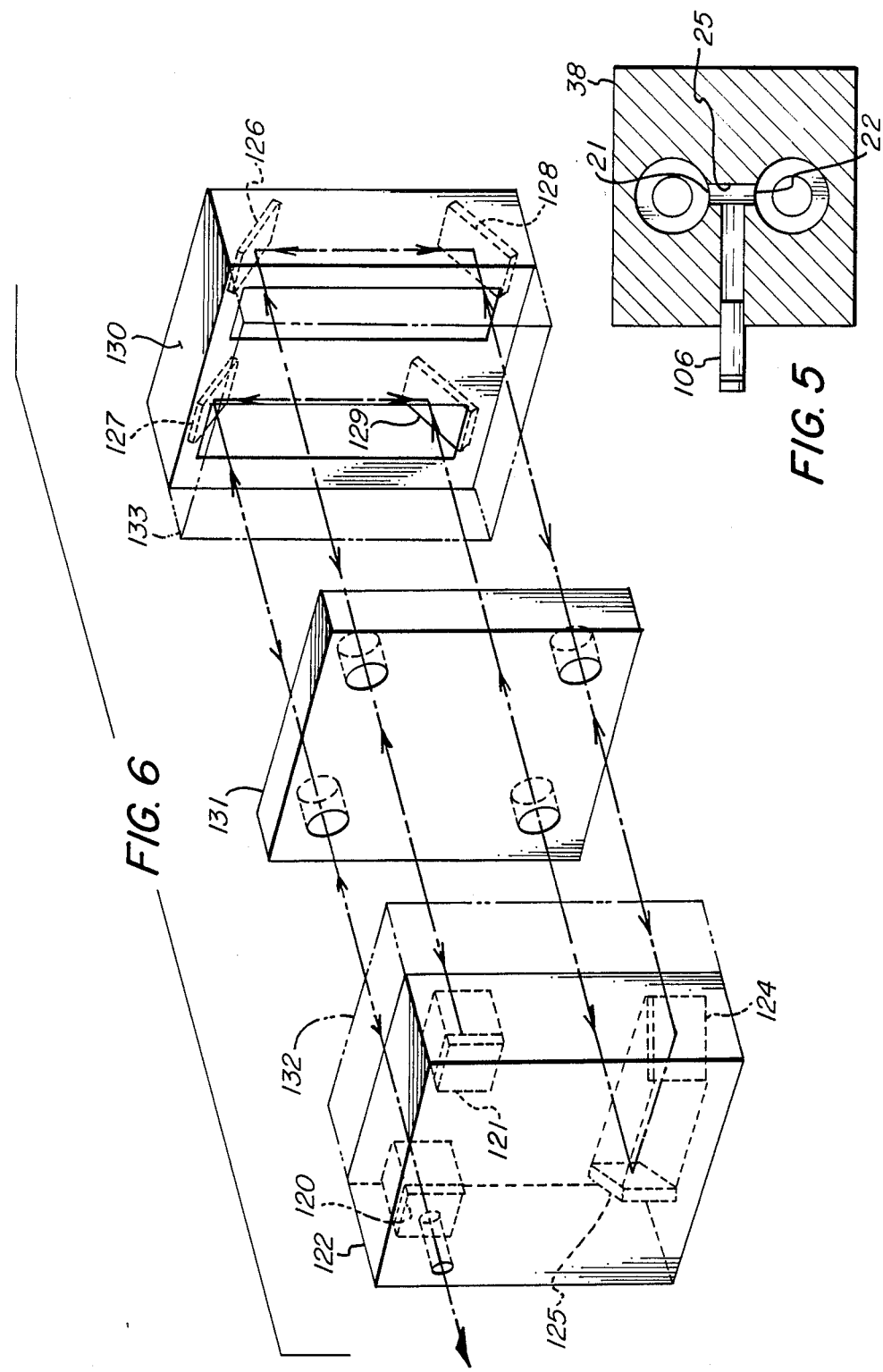

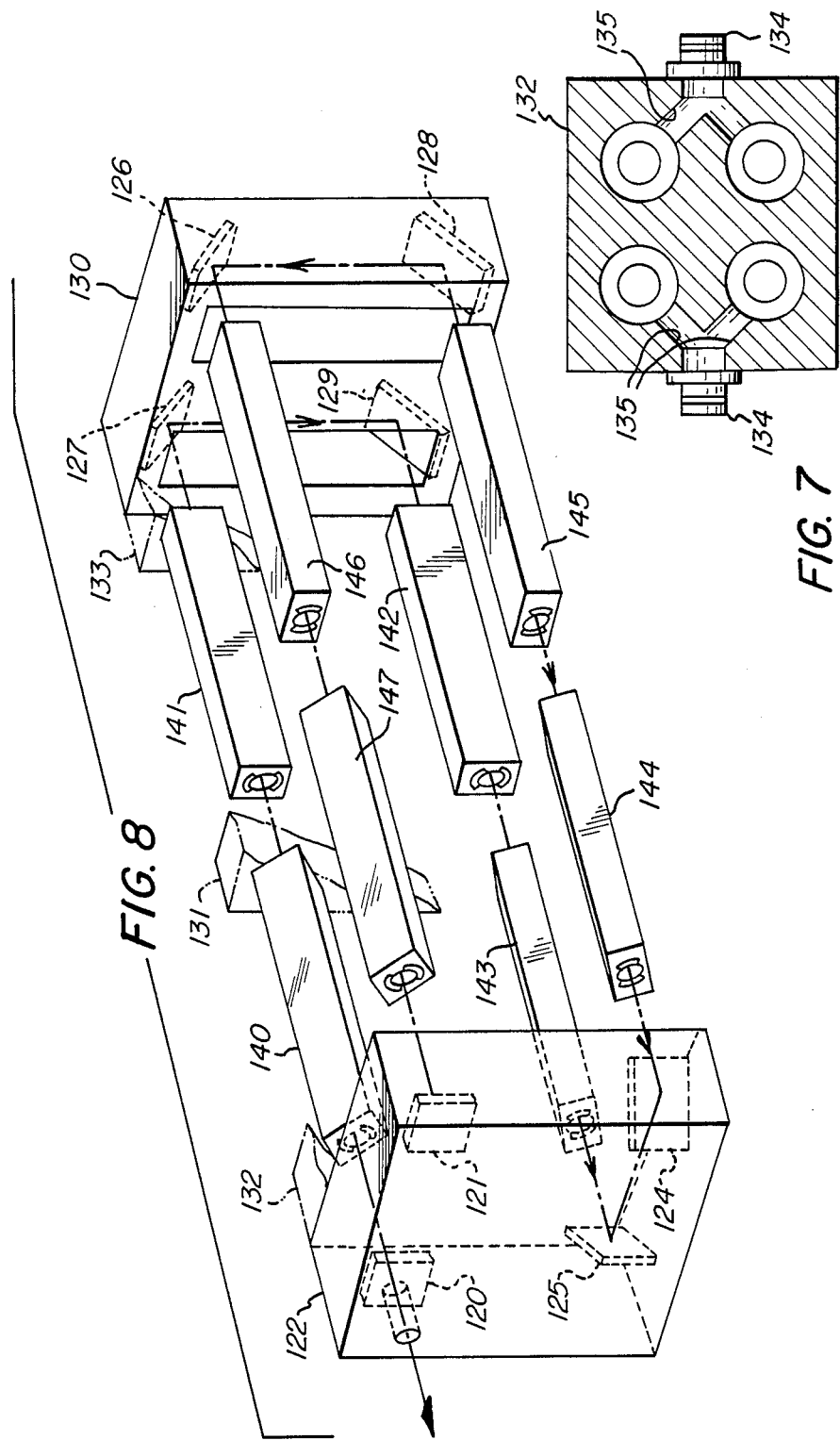

HIGH FREQUENCY FOLDED CROSS-FLOW GAS LASER WITH APPROVED GAS FLOW CHARACTERISTICS AND METHOD FOR PRODUCING LASER BEAM USING SAME

BACKGROUND OF THE INVENTION

The present invention is directed to gas lasers, and more particularly, to high frequency energy cross-flow gas lasers.

Cross-flow gas lasers employ opposed electrodes along the path of laser gas flow to produce electrical discharge in the laser gas to excite the molecules and thereby generate a laser beam. This laser beam is oscillated between the mirrors at opposite ends of the laser path until a predetermined energy level is reached, and the amplified laser beam passes through the output mirror for subsequent utilization in various types of processing equipment.

Typically, such gas lasers for industrial purposes use carbon dioxide, nitrogen and helium in various mixtures. As is well known, such gas lasers generally employ cooling of the lasing gas which is flowing therethrough if the gas is being recycled along the flow path. As a result, it is customary to feed the gas exiting from the flow path to a gas cooler wherein the gas is cooled and then recycled to the laser conduit.

When the energy supplied to the electrodes and thereby to the laser gas is of a very high power, above 5 kilowatts, there is a tendency for the laser gas to heat rapidly. This reduces the efficiency of the laser and tends to cause adverse effects upon the stability of the laser apparatus, such as misalignment of mirrors and the like.

It is an object of the present invention to provide a novel high frequency cross-flow gas laser which exhibits desirable stability and relatively long life.

It is also an object to provide such a laser which can be fabricated from rugged and relatively long-lived components and at reasonable cost.

Another object is to provide such a cross-flow laser which is adapted for use with frequencies in excess of 10 megahertz to produce an output laser beam in excess of 500 watts.

A further object is to provide a novel method of generating a laser beam having a power in excess of 500 watts and which is characterized by relatively high efficiency and relatively trouble-free operation.

SUMMARY OF THE INVENTION

It has now been found that the foregoing and related objects may be readily attained in a high frequency cross-flow gas laser having an elongated tubular member having an aperture at least at one end for passage of the light beam therethrough, a multiplicity of gas feed ports into the tubular member including one at each end of the tubular member, and a multiplicity of gas exit ports from the tubular member spaced along the length thereof and intermediate the ends thereof to define at least two flow sections along the tubular member between a gas feed port and a cooperating gas exit port. Laser gas cooling means is coupled to the gas feed and exit ports by conduits, and there is also provided means for circulating laser gas from the cooling means to the feed ports, and from the exit ports to the cooling means to effect circulation of cooled gas to the several flow sections of the tubular member. A pair of spaced electrodes extends axially along each flow section of the tubular member, and a source of high frequency energy is connected thereto by circuit means for generating a high frequency field across the gas flowing in the tubular member.

The assembly will include a multiplicity of mirrors along the tubular member including a mirror at each of its ends, and feed ports are provided adjacent each of the mirrors to feed cooled gas thereabout.

Desirably, the tubular member has at least one portion of generally U-shaped configuration to provide at least one generally U-shaped path for the light rays (a folded laser), which will include spaced, generally parallel paths and a transverse path extending between the ends of spaced parallel paths. A multiplicity of mirrors is provided along the tubular member including a mirror at each end of the transverse path and a mirror at the opposite end of each parallel path to redirect the light rays therealong, and feed ports are provided at the ends of the path adjacent each of the mirrors to feed cooled gas thereinto. Exit ports are located intermediate the length of the parallel paths to define four flow sections in each U-shaped path.

Preferably, a common feed member communicates with the pair of feed ports adjacent the free ends of a cooperating pair of parallel paths, and a common feed member communicates with the pair of feed ports adjacent the transverse path. Each of the flow sections has a pair of opposed electrodes therealong, one pair being disposed along each flow section between a feed port and a cooperating discharge port.

In a particularly desirably embodiment, pairs of electrodes are radially offset about the circumference of the tubular member relative to the circumferential orientation of other pairs to better distribute the electrical discharge in the flowing gas. This may be accomplished by having at least one pair of electrodes rotatable about the tubular member, or the tubular member rotatable with the electrode pair fixedly supported thereon.

The tubular member is preferably comprised of a multiplicity of tubular elements having their ends rotatably seated in sealing relationship in mounting blocks. In this construction, at least one of the tubular elements may be rotatable in its mounting blocks to alter the radial orientation of the electrode pair located therealong relative to at least one other electrode pair. The feed ports and exit ports may be provided at the ends of the tubular elements, and the mounting blocks provide, in part, the conduits communicating therewith.

In one embodiment, a rotatable tubular element has means thereon for effecting its rotation and thereby the radial orientation of the electrode pair. There may be included drive means engageable with the rotational means to effect its rotation, and this drive means may be connected to computer control means to effect automatic rotation of the rotational means.

The preferred construction is one in which the tubular member has four parallel paths (a double-folded laser) with mirrors at the ends of each of the parallel paths and with exit ports intermediate the length of each of the parallel paths to define a total of eight flow sections. A pair of common feed members is provided at the ends of the parallel paths for introducing cool gas at the ends adjacent the mirrors, and a common outlet member is provided intermediate the length of the parallel paths to collect heated gas from the flow sections.

Generally, the circulating means and cooling means provide a velocity for the gas flowing through the conduit in the range of 100–300 meters per second and a gas feed temperature of not more than 45° Celsius. The high frequency energy source and electrodes provide a discharge frequency of 10 to 30 megahertz, and the flow sections are not greater than 0.6 meter in length.

Thus, this apparatus provides a novel method for generating a laser beam in which there is provided an elongated tubular member having mirrors at the ends thereof, with one of the mirrors being adapted to permit the passage of the laser beam therethrough. A lasing gas mixture at a temperature not more than 45° Celsius is introduced at a multiplicity of points along the length of the tubular member including points adjacent the ends where the mirrors are located. An electrical discharge is produced in the flowing gas at a frequency of 10 to 30 megahertz to generate a laser beam therein, and heated gas is removed from a point along the length of the tubular member to divide the flow path therethrough into a multiplicity of flow sections. The heated gas withdrawn from the tubular member is cooled and then recycled to the tubular member.

BRIEF DESCRIPTION OF THE DRAWINGS

FIG. 2 is a similar diagrammatic view of another embodiment of a laser of the present invention;

FIG. 3 is a composite of several diagrammatic cross-sections along the laser conduit of FIG. 2 to show the electrodes in various rotated positions;

FIG. 4 is a view illustrating schematically an assembly for effecting controlled rotation of the electrodes relative to the tubular laser member;

FIG. 5 is a partially diagrammatic cross-section through an inlet block for the tubular elements of FIG. 1;

FIG. 6 is a schematic illustration of a double-folded laser embodying the present invention;

FIG. 7 is a schematic cross-section through an inlet block thereof; and

FIG. 8 is a schematic illustration of the rotated electrode pairs along the several flow segments thereof.

DETAILED DESCRIPTION OF THE ILLUSTRATED EMBODIMENTS

Figure 1:
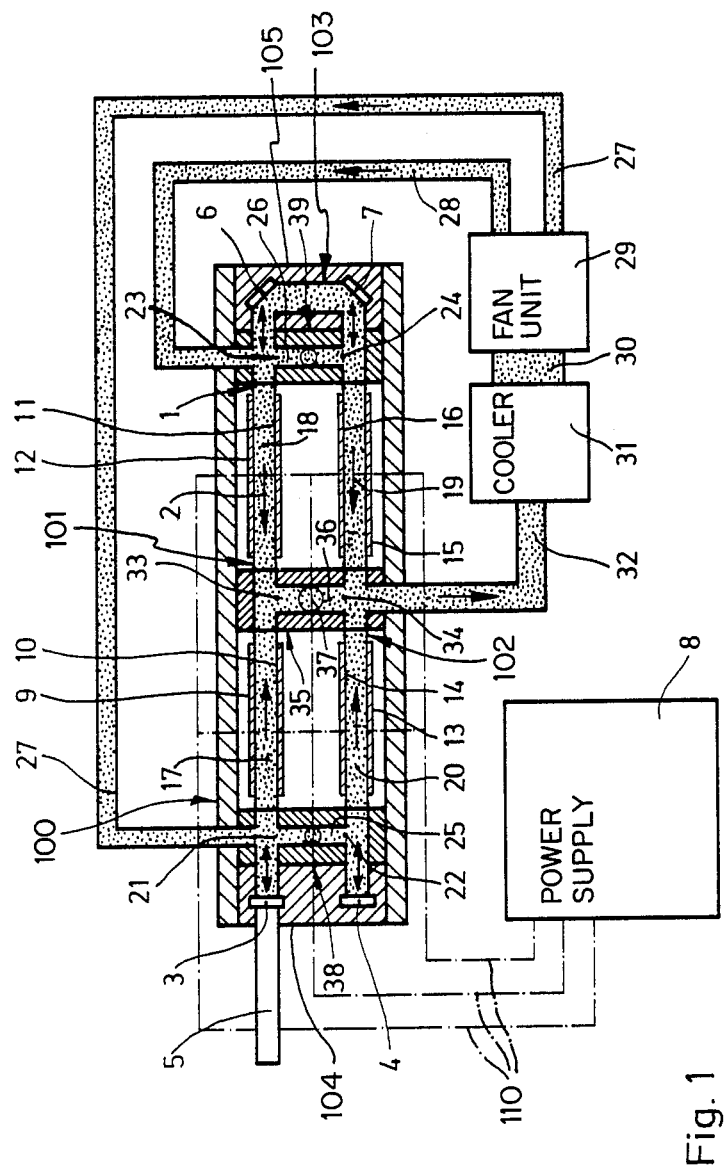
FIG. 1 is a diagrammatic illustration of a cross-flow gas laser embodying the present invention with the tubular body member and various conduits illustrated in section.

Turning first to FIG. 1 of the attached drawings, therein schematically illustrated is a cross-flow gas laser embodying the present invention and having an elongated tubular member generally designated by the numeral 1 and which is illustrated as supported within a housing generally designated by the numeral 100. The tubular member 1 is of generally U-shaped configuration to provide a pair of elongated leg sections 101 and 102, and a transverse section 103 (a folded laser). For convenience in fabrication and other advantages, the tubular member 1 is comprised of a series of tubular elements having their ends seated in seals in the inlet blocks 38 and 39, on the discharge block 35 and in the end blocks 104 and 105.

Seated in the end block 105 are a pair of angled mirrors 6 and 7 at the ends of the transverse leg section 103 to effect redirection of the laser rays from one of the leg sections 101, 102 to the other. Seated in the end block 104 at the distant end of the leg section 102 is the end mirror 4. Also seated in the end block 104 at the end of the leg section 101 is the output mirror 3 through which the laser beam will pass after it has reached a predetermined power level, and it will then continue into the laser output tube 5 for direction to the workstation.

As best seen in FIG. 5, the inlet blocks 38, 39 are formed with a feed passage 107 from a coupling 106 to channel 25 (or 26) which extends to ports 21 and 22 (or 23 and 24) in the recesses or bores seating the ends of the tubular elements providing the tubular member 1. The outlet block 35 is similarly formed with a discharge passage 37 from a coupling (not shown) to a channel 36 which extends between the ports 33, 34 at the recesses or bores seating the ends of the tubular elements. The feed couplings 106 in turn communicate with the supply conduits 27 and 28, and the coupling (not shown) on the block 35 in turn communicates with the outlet conduit 32. Only for convenience of illustration in FIG. 1, the conduits 27, 28 and 32 appear to communicate directly with one of the leg sections 101 and 102.

A fan unit or similar device for circulating the gas through the tubular member 1 is indicated schematically by the block 29 to which the feed conduits 27, 28 are coupled. The fan unit 29 in turn communicates with the gas cooler 31 through the conduit 30. As a result, heated gas is withdrawn by the fan unit 29 from the tubular member 1 through the conduit 32 into the gas cooler 31 where it is chilled and thence recycled to the tubular member 1. As a result, it can be seen that cool gas flows through the feed conduits 27 and 28 into the channels 25 and 26 and thence into the spaced leg sections 101, 102 of the tubular member 1.

The mirrors 3 and 4, 6 and 7 preferably are cooled by liquid coolant flowing through conduits in the blocks thereabout, and there will be relatively little gas flow towards the mirrors. The great volume of the gas flow will be in the direction of the arrows towards the center of the leg sections 101, 102. There the gas exits the tubular leg sections 101, 102 and enters the channel 36 through the discharge ports 33, 34, and it exits the channel 36 through the exhaust conduit 37 and exhaust pipe 32 for flow to the gas cooler 31.

As a result, there are defined four distinct gas flow paths indicated by the numerals 17, 18, 19 and 20, each representing approximately one-half the effective length of the leg sections 101, 102 between the feed blocks 38 and 39.

For convenience of illustration, the distance of the mirrors 3, 4, 6 and 7 from the adjacent gas feed ports 21, 22, 23 and 24 is exaggerated relative to the actual length of the flow paths 17, 18, 19 and 20, which have been shortened. In actuality, the spacing of the mirrors from the point of entry of the cool gas is relatively short to ensure a high level of cool gas flow over most of the length of the laser path to provide temperature stability.

Along each of the leg sections 101, 102 of the tubular member 1 are two pairs of electrodes 9 and 10, 11 and 12, 13 and 14, and 15 and 16. These electrodes are diametrically spaced and extend over substantially the entire length of the gas flow paths 17, 18, 19 and 20 defined between the blocks 35 and 38, and 35 and 39. The electrodes 9–16 in turn are coupled to a high frequency generator schematically illustrated by the block 8, and the electrical leads therebetween are schematically illustrated by the dot-dash lines and designated by the numeral 110.

In operation of the illustrated apparatus, gas is introduced into the system, cooled in the gas cooler 31 and circulated into the tubular member 1 through the feed lines 27 and 28 which communicate respectively with the inlet blocks 38 and 39. The gas passes into the channels 25 and 26 and thence through the feed ports 21, 22 and 23, 24 to commence its flow through the elements of the tubular member 1. A small portion of the gas may flow in the direction of the mirrors 3, 4, 7 and 8, but the great volume flows in the direction of the arrows towards the outlet block 35.

As the gas flows along the flow paths 17, 18, 19 and 20, high frequency energy from the generator 8 and flowing through the electrodes 10–16 causes electrical discharges within the gas and generates a laser beam. This laser beam is reflected along the leg sections 101 and 102 between the mirrors 3, 4, 6 and 7 until the beam is amplified, and then the beam exits the output mirror 3 and is passed along the output tube 5 to a workstation or other processing location.

As the gas flows along the flow paths 17–19, it is being rapidly heated by the high frequency discharge until it exits through the exit ports 33 and 34. It then passes through the conduits 37 and 32 which carry it to the gas cooler 31 for cooling and subsequent recirculation.

Turning now to the embodiment of FIG. 2, the several electrode pairs 40, 41, 42 and 43 are shown in diametrically opposed relationship but in various radially rotated positions relative to the axis of gas flow through the tubular member 1. Their relatively rotated positions are shown in FIG. 3.

By altering the radial disposition of the electrodes about the circumference of the tubular member 1, a more uniform distribution of energy from the electrodes into the gas flowing therethrough may be obtained, thus increasing the efficiency of operation of the laser apparatus.

In accordance with one aspect of this embodiment, the electrodes may be fixedly positioned upon the tubular member 1 in the desired radially rotated orientation. Alternatively, when separate tubular elements are employed to fabricate the tubular member 1, these may be journalled in the blocks 36, 38 and 39 so that they may be rotated therein to effect the desired angular adjustment to obtain more uniform distribution of energy. As seen in FIGS. 2 and 4, a gear 44 may be provided about the periphery of the tubular elements adjacent one end thereof, and a pinion gear 45 connected to a small drive motor 111 is utilized to effect controlled rotation thereof to orient the angular relationship of the electrodes. This can be done automatically by utilizing a series of drive motors 111 which in turn are connected to a computer control 112 to effect operation of the motors 111 in either direction of rotation. Thus, from time-to-time, the positioning of the electrodes may be varied, and the computer control 112 may be set to change the orientation of the electrodes in accordance with a timed sequence.

Turning now to FIGS. 6–8, therein schematically illustrated is a preferred embodiment of the present invention comprising multiple U-shaped paths, referred to hereinafter as a double-folded laser. As seen in FIG. 6, the output and end mirrors 120 and 121, respectively, are both located in the upper horizontal plane in one end block 122, and a pair of diagonal mirrors 124, 125 are disposed in the block 122 therebelow. Four diagonal mirrors 126, 127, 128 and 129 are disclosed in the opposite end block 130. As a result, the laser path between the end mirror 121 and output mirror 120 is divided into eight horizontal segments 140–147 by the outlet block 131 disposed intermediate the inlet blocks 132 and 133.

For convenience, the blocks 132 and 133 have a pair of couplings 134 for receiving the cooled gas and distributing it through channels 135 to the recesses seating the several elements comprising the tubular conduit 1. Similarly, the outlet block 131 has two couplings (not shown) which communicate with the recesses (not shown) seating the several tubular elements for discharge of the gas flowing thereinto from the several tubular elements and return to the cooler.

As seen in FIG. 8, each of the electrode pairs is radially rotated 45° along the several sections of the laser path to achieve the most uniform laser beam structure.

Illustrative of the efficacy of the present invention is the following specific example:

A double-folded laser of the type illustrated in FIGS. 6–8 is formed utilizing quartz tubes of 16 mm. internal diameter. Eight tubes of 350 mm. length are sealingly seated in blocks of the type illustrated in FIG. 8 to provide an overall laser path length between end mirror and output mirror of about 3 meters. In this device, the electrodes are aluminum and approximately 300 mm. in length. The power supply utilized may vary from 7–15 kilowatts and the discharge frequency of the electrodes will be in the range of 10–30 megahertz.

The laser gas mixture is 4–6% carbon dioxide, 18–22% nitrogen and 75–82% helium; its flow rate is 500–1500 cubic meters per hour; its velocity is 150–200 meters per second; and the pressure is 80–150 millibars. The gas is cooled to a temperature of 30°–40° Celsius, and the output temperature of the gas from the several flow paths is about 200° Celsius when the laser is operated at an output of about 1.2–1.5 kilowatts.

This laser apparatus has been found to operate effectively for extended periods of time and to produce power outputs ranging from 500–2000 watts with a consistent mode, $TEM_{oo}$. Its efficiency has been determined to be within the range of 15–18 percent.

As will be readily appreciated, the present invention enables the utilization of high frequencies in a cross-flow gas laser since the gas is travelling relatively short distances and at relatively high velocity between a feed port and a discharge port, and because the cooled gas is minimizing heat transfer to the mirrors so as to minimize the effects of temperature change that might occur otherwise. The use of multiple tubular elements seated in inlet and outlet blocks to provide the conduit enables the efficient and rapid transfer of the gas between the tubular member and the feed or discharge conduits as the case may be. Moreover, expansion and contraction effects are avoided. Generally, the conduits are divided into sections of not more than 0.6 meter in length and preferably of less than 0.4 meter in length.

Quartz or ceramic tubes having an inner diameter of 10–20 mm. have been found highly satisfactory in providing the desired high velocity gas flow and efficient high frequency discharge in that gas flow.

The fan or other means utilized to provide the flow of the lasing gas mixture through the conduit should provide a velocity the range of 120–300 meters per second. With quartz tubes in the range of diameters indicated above, the flow rate will normally be in the range of 500–1500 cubic meters per hour. To provide the desired flow, the gas pressure will generally be maintained in the range of 80–150 millibars.

The power supply will normally be within the range of 7–15 kilowatts, and the aluminum electrodes to which the power supply is connected will have a length somewhat shorter than the individual flow sections and should not exceed about 300 mm. in length. The electrodes are cooled by a coolant system and are driven by the power source to produce a frequency of 10–30 megahertz and preferably 12–18 megahertz.

Although a laser having a single straight length divided into two flow sections is feasible, the preferred laser constructions will generally be of at least single folded, and desirably double-folded, construction so as to allow the efficient generation of high wattage laser beams. With double-folded lasers, outputs of 0.5 to 2 kilowatts are readily attainable, and efficiencies of up to 18% are possible.

The cooler for the gas mixture must be highly efficient to effect the desired heat transfer in relatively short periods of time. The gas being introduced into the feed conduits should not exceed 45° Celsius and preferably is at less than 40° Celsius. Despite the relatively short distances travelled, the high frequency discharge elevates the temperature of the lasing gas mixture to temperatures in excess of 150 °Celsius and often to 200° Celsius or more.

The electrode pairs in the several sections are desirably rotated as indicated in FIG. 3 and in FIG. 8 since this effects the most desirable distribution of electrical energy throughout the cross-section of gas flow in the tubular conduit. For example, if only four flow sections are provided, the pairs of electrodes may be rotated radially over an arc of 45° or 90° about the circumference. When eight flow segments are employed, the pairs of electrodes may be rotated 22.5° or 45°. By this rotation, which can be manually effected at the time of assembly, and thereafter fixed periodically, or automatically, a more uniform distribution of energy is provided throughout the lasing gas mixture as it flows rapidly therethrough.

From the foregoing detailed specification and attached drawings, it can be seen that the laser assembly of the present invention is one which may be fabricated readily and economically from durable components to provide a long-lived assembly. The relatively short flow sections and high velocity of the flowing gas enable high frequency electrical discharge to stimulate the generation of the laser ray beam, and enable continuous operation over extended periods of time without drift or negative effects caused by increasing temperature. Moreover, by utilizing a series of tubular elements to provide the conduit, and mounting blocks which provide the flow passage for the gas into or from the tubular elements, the thermal expansion and contraction which may occur along the tubular member can be readily accommodated without altering the overall length of the flow path for the laser from end-to-end.

Having thus described the invention, We claim:

1. In a high frequency cross-flow gas laser, the combination comprising:
   (a) an elongated tubular member having at least two portions of U-shaped configuration joined by a portion extending perpendicularly between two adjacent ends of said U-shaped portions so that said U-shaped portions lie in spaced, substantially parallel planes, said tubular member having an aperture at another of said ends of such U-shaped portions for passage of the light beam therethrough, each U-shaped portion comprising a pair of spaced parallel paths and a transverse interconnecting path extending between adjacent ends of said parallel paths opposite said perpendicular portion and mirrors at the ends of said transverse interconnecting path and at the opposite end of each parallel path for redirecting the laser beam to adjacent paths until discharged through said aperture;
   (b) a multiplicity of gas feed ports into said tubular member including one adjacent said mirrors at each end of each of said spaced parallel paths of said tubular member;
   (c) gas exit ports in said tubular member spaced along the length of each of said spaced parallel paths intermediate the ends thereof to define at least two flow sections along each of said spaced parallel paths of said tubular member and defined between a gas feed port adjacent one of said mirrors and a cooperating gas exit port;
   (d) laser gas cooling means;
   (e) conduits between said laser gas cooling means and each of said gas feed and exit ports;
   (f) means for circulating laser gas through said conduits from said cooling means to said feed ports adjacent said mirrors and from said exit ports to said cooling means to effect circulation of cooled gas to said flow sections of said tubular member;
   (g) a multiplicity of cooperating pairs of spaced, axially extending electrodes along said parallel paths of said tubular member, each of said flow sections having a pair of electrodes extending therealong;
   (h) a source of high frequency energy; and
   (i) circuit means connecting said high frequency energy source to said pairs of electrodes for generating a high frequency field across the cross-section of the tubular member.

2. The cross-flow gas laser in accordance with claim 1 wherein a first common feed member communicates with a pair of feed ports adjacent the ends of the parallel paths spaced from said transverse path between them, and a second common feed member communicates with a pair of feed ports adjacent the transverse path.

3. The cross-flow gas laser in accordance with claim 1 wherein a common feed member communicates with the feed ports adjacent the free ends of the parallel paths of said tubular member, wherein a common feed member communicates with the feed ports adjacent said transverse path of said tubular member, and wherein a common discharge member communicates with exit ports spaced along the length of said parallel paths.

4. The cross-flow gas laser in accordance with claim 1 wherein at least one pair of electrodes is radially offset about said tubular member relative to the orientation of the pair of electrodes along the adjacent flow sections.

5. The cross-flow gas laser in accordance with claim 1 wherein at least one pair of electrodes is rotatable about said tubular member.

6. The cross-flow gas laser in accordance with claim 1 wherein said tubular member is comprised of a multiplicity of tubular elements having their ends seated in sealing relationship in mounting blocks.

7. The cross-flow gas laser in accordance with claim 6 wherein at least one of said tubular elements is rotatable in its mounting blocks to alter the radial orientation of the electrode pair located therealong relative to that of at least one other electrode pair.

8. The cross-flow gas laser in accordance with claim 6 wherein feed ports and exit ports are provided at the ends of said tubular elements and said mounting blocks have passages which provide a portion of said conduits communicating with said ports.

9. The cross-flow gas laser in accordance with claim 7 wherein said at least one tubular element has rotational means thereon for effecting its rotation.

10. The cross-flow gas laser in accordance with claim 9 wherein there is included drive means engageable with said rotational means, and said drive means is connected to control means for automatic rotation thereof.

11. The cross-flow gas laser in accordance with claim 1 wherein said tubular member has only two U-shaped portions providing four parallel paths to provide a double-folded laser with mirrors at the ends of each of said parallel paths and with exit ports intermediate the length of each of said parallel paths to define eight flow sections.

12. The cross-flow gas laser in accordance with claim 11 wherein a pair of common feed members is provided at the ends of said parallel paths for introducing cool gas adjacent said mirrors and wherein a common outlet member is provided intermediate the length of said parallel paths to collect heated gas from the flow sections.

13. The cross-flow gas laser in accordance with claim 1 wherein said circulating means and cooling means provide a velocity for the gas flowing through said conduit in the range of 100–300 meters per second and a gas feed temperature of not more than 45° Celsius.

14. The cross-flow gas laser in accordance with claim 1 wherein said high frequency energy source and electrodes provide a discharge frequency of 10 to 30 megahertz.

15. The cross-flow gas laser in accordance with claim 1 wherein said flow sections are not greater than 0.6 meter in length.

16. In a method for generating a laser beam, the steps comprising:
(a) providing an elongated tubular member having at least two portions of U-shaped configuration joined by a portion extending perpendicularly between adjacent ends of said U-shaped portions so that said U-shaped portions lie in spaced, substantially parallel planes, said tubular member having an aperture at ends of said U-shaped portion for passage of a light beam therethrough, each U-shaped portion comprising a pair of spaced parallel paths and a transverse interconnecting path extending between adjacent ends of said parallel paths opposite said perpendicular portion and having mirrors at the ends of said transverse interconnecting path and at the opposite end of each parallel path for redirecting a laser beam to adjacent paths until discharged through said aperture, one of said mirrors adjacent said aperture being adapted to permit the passage of the laser beam therethrough;
(b) introducing a lasing gas having a temperature not more than 45° Celsius into said tubular member adjacent each of said mirrors along the length of said tubular member to cause it to flow along said tubular member;
(c) supplying energy to a multiplicity of pairs of electrodes spaced along said spaced parallel paths to produce an electrical discharge in the flowing gas at a frequency of 10 to 30 megahertz to generate a laser beam therein;
(d) removing heated gas from an exit port intermediate the length of each of said spaced parallel paths of said tubular member to divide the flow path therethrough into a multiplicity of flow sections;
(e) cooling the gas withdrawn from said tubular member; and
(f) recycling the cooled gas to said tubular member adjacent said mirrors.

17. The method of producing a laser beam in accordance with claim 16 wherein said gas is caused to flow through said tubular member at a velocity of 100–250 meters per second.

18. The method of producing a laser beam in accordance with claim 16 wherein each of said flow sections does not exceed 0.5 meters in length.

19. The method of producing a laser beam in accordance with claim 16 wherein pairs of electrodes are rotated about the axis of the tubular member relative to the radial position of the adjacent pairs of electrodes.

* * * * *